(12) United States Patent
Nomoto et al.

(10) Patent No.: US 6,507,480 B2
(45) Date of Patent: Jan. 14, 2003

(54) ELECTRIC DOUBLE LAYER CAPACITOR

(75) Inventors: Susumu Nomoto, Souraku-gun (JP);
Masakazu Tanahashi, Osaka (JP);
Mikinari Shimada, Yawata (JP);
Emiko Igaki, Amagasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/080,452

(22) Filed: Feb. 22, 2002

(65) Prior Publication Data

US 2002/0159222 A1 Oct. 31, 2002

(30) Foreign Application Priority Data

Feb. 26, 2001 (JP) ........................................ 2001-050911

(51) Int. Cl.[7] ................................................ H01G 9/00
(52) U.S. Cl. ........................................................ 361/502
(58) Field of Search .................................. 361/502, 511, 361/512, 517, 504, 530, 531, 533, 538, 535

(56) References Cited

FOREIGN PATENT DOCUMENTS

| JP | 62-17185 A | 1/1987 |
|----|------------|--------|
| JP | 11-26329 A | 1/1999 |
| JP | 2000-311680 A | 11/2000 |

*Primary Examiner*—Anthony Dinkins
(74) *Attorney, Agent, or Firm*—Merchant & Gould P.C.

(57) ABSTRACT

An electric double layer capacitor of the present invention having a capacitor element and an electrolyte arranged in a case sealed with a sealer, and further includes in the case a solid buffer for suppressing fluctuation in pH of the electrolyte. The solid buffer includes a compound selected from an oxide and a hydroxide. An element contained in the compound is at least one selected from the group consisting of Be, Al, Si, Sc, V, Cr, Fe, Ni, Cu, Zn, Ga, Ge, Y, Zr, Mo, Ag, Cd, In, Te, La, Ce, Pr, Nd, Pm, Gd, Dy, Ho, Er, Tm, Lu, W and Pb.

10 Claims, 1 Drawing Sheet

ELECTRIC DOUBLE LAYER CAPACITOR

BACKGROUND OF THE INVENTION

1. Field of the Invention

The present invention relates to an electric double layer capacitor having a high withstand voltage.

2. Related Background Art

An electric double layer capacitor is a device that can store electric energy, and such a capacitor is used for a backup power source or the like that is required to be highly reliable, since the lifetime of the electric double layer capacitor is longer than that of a secondary battery. Larger electric double layer capacitors are expected to be used for power leveling or the like. However, since a typical electric double layer capacitor has a smaller energy density in a comparison with a secondary battery, the improvement of the energy density should be achieved in developing such an electric double layer capacitor.

The energy density of an electric double layer capacitor is proportional to capacitance and also proportional to a square of a withstand voltage. The withstand voltage of the electric double layer capacitor is determined depending on a withstand voltage of the applied electrolyte, i.e., a voltage just before the occurrence of electrolysis. However, for various reasons, withstand voltages of commercially available electric double layer capacitors are set to be considerably lower than the voltages at which electrolysis occurs. One of the reasons is the electrolysis of content moisture contained in the electrolyte. When the content moisture is electrolyzed, alkali is generated in the vicinity of a cathode. This alkali corrodes a sealing member, and thus, sealing performance of the product will deteriorate. JP-A-11(1999)-26329 suggests formation of a coating layer of an insulating rubber-denatured hydrocarbon resin on a surface of a sealer that is contacted with a lead at the cathode side so as to prevent deterioration of the sealing performance. However, such a coating layer is insufficient for suppressing deterioration in the sealing performance, where the deterioration is caused by alkali generated during application of a high voltage. Therefore, for securing the reliability of the product, the voltage should be lowered, and this causes a difficulty in raising the withstand voltage.

An electric double layer capacitor being used for power leveling or any other purposes relating to energy supply requires further increased capacity when compared to a circumstance that the same electric double layer capacitor is used as a backup power source. Moreover, since the operating voltage of the load is high, a plurality of electric double layer capacitors should be connected in series. When even one of the serially connected electric double layer capacitors has a problem, the capacitors of the same series cannot be used any more. Especially when a serial connection is a precondition in use, raising the withstand voltage of each capacitor is required.

SUMMARY OF THE INVENTION

A purpose of the present invention is to provide an electric double layer capacitor having a high withstand voltage.

For the above-mentioned purpose, an electric double layer capacitor of the present invention comprises a sealing member, an electrolyte and an electric double layer capacitor element, both of which are sealed in the sealing member, and the electric double layer capacitor further comprises a solid buffer to suppress fluctuation in the pH of the electrolyte.

Since the solid buffer stabilizes the pH of the electrolyte, corrosion is suppressed in the electric double layer capacitor of the present invention, and thus the withstand voltage is improved. Furthermore, since the solid buffer used herein is present without being dissolved in the electrolyte, the solid buffer can be prevented from affecting characteristics other than the withstand voltage of the electric double layer capacitor.

Though there is no specific limitation on the solid buffer as long as it is remains in stable even when contacted with an electrolyte, a suitably used buffer is at least one compound selected from an oxide and a hydroxide. It is more preferable that the solid buffer is a compound (an oxide and/or a hydroxide) of at least one element selected from the group consisting of Be, Al, Si, Sc, V, Cr, Fe, Ni, Cu, Zn, Ga, Ge, Y, Zr, Mo, Ag, Cd, In, Te, La, Ce, Pr, Nd, Pm, Gd, Dy, Ho, Er, Tm, Lu, W and Pb.

It is preferable that the solid buffer adheres to a sealing member. When the sealing member comprises a case having an opening and a sealer for sealing the opening, the solid buffer can adhere to the case and/or the sealer. In an electric double layer capacitor further comprising a lead extending from the interior of the case to outside, the solid buffer can adhere to the lead in the case. In any of these preferred examples, a solid buffer suspending in the electrolyte is prevented from adhering to either a surface of an electrode or a separator composing the electric double layer capacitor element, so that lowering of the self-discharge characteristics can be avoided.

Further purposes, properties and advantages of the present invention will be described fully in the following passages. Advantages provided by the present invention are described below with a reference to the attached drawings.

DETAILED DESCRIPTION OF THE INVENTION

Preferred embodiments according to the present invention are described below by referring to attached drawings.

Considering the structures, electric double layer capacitors can be classified roughly into a cylinder-type and a coin-type. A typical cylinder-type electric double layer capacitor has some merits such as high capacity and low resistance in comparison with a coin-type electric double layer capacitor, while such a cylinder-type electric double layer capacitor cannot be as small as a coin-type capacitor.

Figure 1:
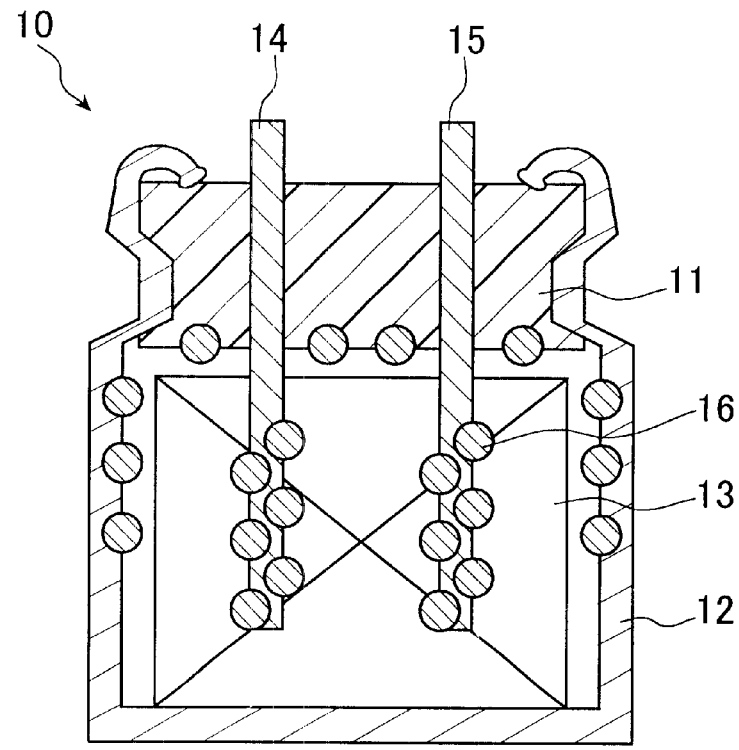
FIG. 1 is a cross-sectional view showing an embodiment of an electric double layer capacitor (cylinder-type electric double layer capacitor) according to the present invention.

A cylinder-type electric double layer capacitor 10 shown in FIG. 1 comprises a cylindrical case 12 provided with an opening, a capacitor element 13 and an electrolyte (not shown) both sealed in this case 12, and a sealer 11 for sealing the opening of the case 12. The capacitor element 13 has a cathode foil and an anode foil to which a cathode lead 14 and an anode lead 15 are connected respectively. The leads 14 and 15 extend outside of the case 12 through the sealer 11.

Figure 2:
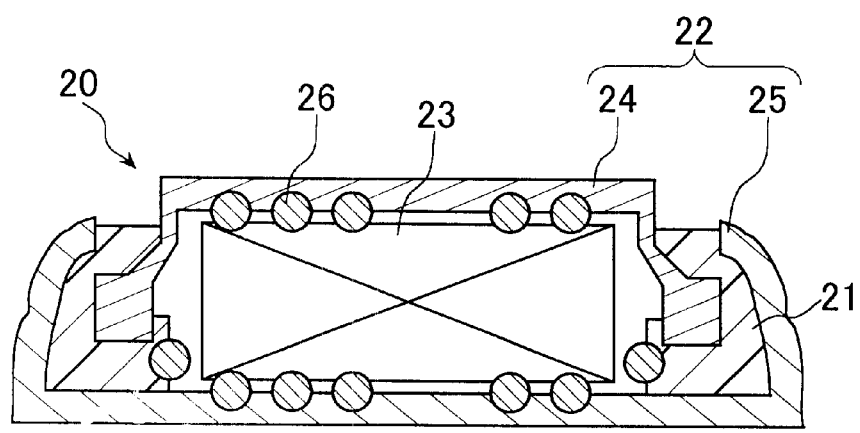
FIG. 2 is a cross-sectional view showing an embodiment of an electric double layer capacitor (coin-type electric double layer capacitor) according to the present invention.

A coin-type electric double layer capacitor 20 shown in FIG. 2 comprises a case 22 provided with an opening and composed of a cathode case 24 and an anode case 25, a sealer 21 to be fitted between the cathode case 24 and the anode case 25 so as to seal the opening of the case 22, and a capacitor element 23 and an electrolyte (not shown) both of which are sealed in the case 22 (i.e., sealed in a space surrounded by the cathode case 24, the anode case 25 and the sealer 21). The capacitor element 23 has a cathode and an anode that are connected respectively to the cathode case 24 and the anode case 25.

In the cylinder-type electric double layer capacitor 10, the capacitor element 13 has electrode foils (a cathode foil or an anode foil), which comprise, for example, a laminate of a collector foil (e.g., an Al foil) and a polarizable electrode foil (e.g., an active carbon layer). In the coin-type electric double layer capacitor 20, the cathode case 24 and the anode case 25 can function also as the collector foils. Therefore, in the coin-type capacitor, only a polarizable electrode foil is arranged for an electrode foil of the capacitor element 23. Viscose rayon or the like can be used for separators (not shown) provided for the capacitor elements 13 and 23.

Solid buffers (16, 26) for retaining the pH of the electrolytes are sealed further in the cases (12, 22) of the electric double layer capacitors (10, 20). Here, a solid buffer denotes a material having a function to suppress fluctuation in pH of an electrolyte. An specific example of the solid buffer is aluminum oxide. When an electrolyte is going to shift to alkali, aluminum oxide changes into aluminum dioxide ions to be dissolved in the electrolyte so as to maintain the pH at a certain level ($Al_2O_3 + 2OH^- \rightarrow 2AlO_2^- + H_2O$). Aluminum hydroxide presents a similar action ($Al(OH)_3 + OH^- \rightarrow 2AlO_2^- + 2H_2O$).

Examples of solid buffers that can restrain rise of the pH caused by generation of $OH^-$ include an oxide and a hydroxide of aluminum (Al) and, oxides and hydroxides of at least one element selected from the group consisting of Be, Si, Cr, Fe, Ni, Cu, Zn, Ga, Ge, Zr, Mo, In, Te, W and Pb. These compounds have a characteristic that their solubility is raised with a rise in pH in an alkali region having high pH. More suitably, the solid buffer is an oxide and/or a hydroxide of at least one element selected from the group consisting of Be, Al, Si, Cr, Zn, Ga, Ge, Mo, In, Te, W and Pb.

An oxide is preferred to a hydroxide in general, since an oxide consumes more $OH^-$ per equivalent amount when compared to a hydroxide as in the example of aluminum hydroxide, and thus, an oxide generates less water. However, there is no substantial difference therebetween when the amount of the solid buffer is not limited and water generated as a secondary product of the reaction is not a substantial consideration.

A solid buffer to neutralize $H^+$ can be used for preventing acidification of the electrolyte. An example of a solid buffer having such an action is yttrium oxide ($Y_2O_3 + 6H^+ \rightarrow 2Y^{3+} + 3H_2O$). Yttrium hydroxide acts similarly ($Y(OH)_3 + 3H^{3O} \rightarrow Y^{3+} + 3H_2O$). Examples of solid buffers that can ease the lowering of pH are not limited to an oxide and/or a hydroxide of yttrium (Y), but they can include oxides and hydroxides of at least one element selected from the group consisting of Be, Al, Sc, V, Cr, Fe, Ni, Cu, Zn, Ga, Zr, Ag, Cd, In, Te, La, Ce, Pr, Nd, Pm, Gd, Dy, Ho, Er, Tm, Lu, and Pb. These compounds have a characteristic that the solubility is raised as pH is lowered in an acidic region with low pH. When an electrolyte shifts remarkably to acidity, metallic materials or the like may be corroded to lower the withstand voltage. Therefore, the above-described compounds also are effective in improving the withstand voltage.

Any other materials can be used for the solid buffers 16 and 26 as long as they are compounds having a similar action and they serve to provide effects of the present invention.

In FIG. 1, the solid buffer 16 adheres to the leads (14, 15), to the sealer 11 and to the case 12. In FIG. 2, the solid buffer 26 adheres to the sealer 21, to the cathode case 24 and to the anode case 25. There is no substantial limitation for the arrangement of the solid buffer. The solid buffer (16 or 26) can be provided so that it can be contacted with an electrolyte in the case (12 or 22). More specifically, the solid buffer 16 in the cylinder-type electric double layer capacitor 10 can adhere to a surface of at least one member selected from the leads (14, 15), the sealer 11, and the case 12. For the coin-type electric double layer capacitor 20, the solid buffer 26 can adhere to a surface of at least one member selected from the cathode case 24, the anode case 25, and the sealer 21. When arranged inside the capacitor element (13 or 23), the solid buffer may affect characteristics other than the withstand voltage of the electric double layer capacitor. When only dispersed in the electrolytes, the solid buffer (16 or 26) may adhere to the electrode surface and to the separator, and thus, it may lower the self-discharge characteristics. The solid buffer (16 or 26) can be provided to the surface and also to the interior of any of the aforementioned materials beads 14, 15; sealers 11, 21; and cases 12, 22).

There is no specific limitation on the arrangement of the solid buffers (16, 26). The solid buffers (16, 26) can be prepared in advance. Alternatively, as described in the following Examples, a solution containing as a solute a compound of an element to compose the solid buffers (16, 26) can be supplied. In the method, the solution is contacted with at least one surface of the aforementioned members. Next, the member to which the solution is contacted with is dried (sometimes by applying heat) to deposit an oxide and/or hydroxide of the element on the surface of the member. In this case, the solute can be a compound for forming the solid buffer 16 or 26. When the compound is difficult to dissolve in an ordinary solvent, a precursor (e.g., nitrate) that is comparatively soluble in the solvent can be used as the solute, so that the precursor will be changed into an oxide on the member's surface by applying heat in an oxygen-containing atmosphere such as air. By adhering the solid buffer (16 or 26) on the surface of at least any one of the members, an electric double layer capacitor (10 or 20) comprising a solid buffer (16 or 26) is obtained in a conventional assembly process. Preferably, the solid buffers (16, 26) are arranged by drying and/or heating the members contacted with the solution, since the solid buffers (16, 26) can be arranged uniformly on the member surfaces.

The arrangement of the solid buffers is not limited to use of solid buffers prepared in advance or use of a solution containing the precursor. A solid buffer (16 or 26) can be positioned on a metal such as aluminum to form a case (12 or 22) and leads (14, 15), and subjected to pressure so that the solid buffer is embedded entirely or partly in the metal and fixed on the metal. For this purpose, the solid buffer (16 or 26) can be fixed firmly when the metal is chemically treated in advance to have a roughened surface. For a rubber-based material often used in the sealer 11 of the cylinder-type electric double layer capacitor 10, the solid buffer 16 can be embedded on the surface as mentioned above. However, since the rubber-based material has high elasticity, the solid buffer 16 cannot be embedded so easily in a metal. Moreover, such a rubber-based material can deteriorate or be degraded due to heat since it has inferior heat resistance to that of metal. Therefore, preferably the rubber-based material is prepared by previously mixing the solid buffer 16 with the starting material. For a resin material often used in the sealer 21 of the coin-type electric double layer capacitor 20, the method of embedding the solid buffer 26 on the surface is not difficult to perform. The solid buffer 26 can be fixed in the vicinity of the surface at the time of curing the resin material.

It is preferable that a sufficient amount of a solid buffer (16 or 26) is supplied with respect to a content of water inherently existing in the electrolytes (hereinafter, an anterior water content) or a water content that is measured after a certain period (hereinafter, a posterior water content). More preferably, the buffer is supplied in an amount that the buffer can neutralize hydroxide ions or hydrogen ions when all of the anterior water content in the electrolytes is changed into these ions. In general, an anterior water content in an electrolyte used for an electric double layer capacitor is about several dozens of ppm, which is increased to about several hundreds of ppm (a posterior water content) when the capacitor is maintained for a long time under a condition of a temperature of 60° C. and a humidity of 95%. If all of the contained water was changed into hydroxide ions and/or hydrogen ions, an equivalent amount of the solid buffer required for neutralizing 20 ppm of anterior water content should be at least about $1 \times 10^{-6}$ for 1 g of the electrolyte. Under this condition, about 0.05 mg of aluminum oxide (the equivalent amount for 102 g (1 mol) is 2) is required. When the posterior water content is 500 ppm, an equivalent amount of the solid buffer required for neutralixing the water is about $3 \times 10^{-5}$ for 1 g of the electrolyte. Under this condition, aluminum oxide (an equivalent amount for 102 g (1 mol) is 2) in an amount of about 1.5 mg is required. As mentioned above, a required amount of the solid buffer varies depending on the anterior water content, and also on the rate of increase of the posterior water content. In the above example, a minimum amount of the solid buffer (16 or 26) needed for functioning as a buffer is in a range from 0.05 mg to 1.5 mg for 1 g in the electrolyte of the electric double layer capacitor (10 or 20). However, these values are based on a hypothesis that all the solid buffers present function. In case only one-tenth thereof was effective, the required amount would be in a range from 0.5 mg to 15 mg. It is preferable that the amount of the solid buffer (16 or 26) to be added is controlled, since an excessive amount of the buffers (16, 26) will adversely affect the devices.

Since the leads (14, 15) or the case (12 or 22) of the electric double layer capacitor (10 or 20) comprise aluminum, native oxide layers are formed on the surface of the member (14, 15, 12 or 22). However, such a native oxide layer alone does not function as a buffer. For the aforementioned coin-type electric double layer capacitor 20, an equivalent amount of $OH^-$ ions generated due to decomposition of water is about $1 \times 10^{-8}$ when water in the electrolyte is 20 ppm, the amount of the electrolyte is 10 $\mu l$, and an area of the case 22 on which the native oxide layer is formed is 1 $cm^2$, while aluminum oxide as the native oxide layer can absorb at most one-tenth of the equivalent amount of $OH^-$ ions.

There is no specific limitation on the sealing members (case 12 or 22, sealer 11 or 21), on the leads (14, 15), on the electrolyte and on the capacitor element (13 or 23), but any conventional members can be used. For example, Al can be used for the cases (12, 22) and leads (14, 15), while butyl rubber, polyphenylene sulfide or the like can be used for the material of the sealer (11 or 21). Typically, the electrolyte can be an organic ionization solution. Such an organic ionization solution comprises a solvent of propylene carbonate, gammabutyrolactone or the like and a solute such as tetraethyl ammonium tetrafluoroborate and triethylmethyl ammonium tetrafluoroborate. Structures and materials of the capacitor elements (13, 23) are exemplified above.

The present invention will be described below more specifically by referring to the following Examples, though the Examples are not intended to limit the present invention.

The following Examples 1 and 2 relate to the cylinder-type electric double layer capacitor 10 shown in FIG. 1.

EXAMPLE 1

In Example 1, an electric double layer capacitor was manufactured by adhering a solid buffer 16 on surfaces of leads (14, 15). For the manufacturing process, an aqueous solution of aluminum nitrate with a concentration of 10 wt % and also aluminum leads (14, 15) were prepared. The leads (14, 15) were dipped in the aqueous solution of aluminum nitrate for several seconds, pulled up from the solution, and held to dry at 80° C. for 15 minutes. This cycle of dipping and drying was repeated until the weight of the aluminum nitrate became approximately 1 mg. Finally, the leads were held at 300° C. for 10 minutes so that the aluminum nitrate adheres to the surfaced of the leads (14, 15).

10 g of active carbon and 4 g of acetylene black were mixed well, to which 40 $cm^3$ of methyl alcohol and 100 $cm^3$ of water were added before being mixed further. The mixture was stirred with a homogenizer while 1.2 g of carboxymethyl cellulose was added little by little, so that an active carbon slurry was produced. Then, an aluminum foil was dipped in the active carbon slurry, pulled up from the slurry, and dried at room temperature for 30 minutes, and further dried at 105° C. for 1 hour. Subsequently, the aluminum foil was peeled off at a part to which the leads (the leads 14, 15 provided with the solid buffer 16) were connected by caulking. The size of the aluminum foil and thickness of an active carbon layer formed as a polarizable electrode foil were designed so that an assembled electric double layer capacitor had a capacitance of about 1 F. The thus obtained two active carbon electrodes with leads were coiled to be cylindrical through a separator made of viscose rayon, dried at 150° C. for about 24 hours, and then dipped in an electrolyte (a propylene carbonate solution of 1 mol/l tetraethyl ammonium tetrafluoroborate) that is used for an electric double layer capacitor, and impregnated under reduced pressure, so that a capacitor element 13 was manufactured. Finally, the capacitor element 13 was attached to a sealer 11 made of butyl rubber that previously was provided with holes for passing the leads (14, 15), filled in the aluminum cylindrical case 12, so that an electric double layer capacitor was obtained

EXAMPLE 2

In Example 2, an electric double layer capacitor was manufactured by adhering a solid buffer 16 to an inner surface of a case 12. For the manufacturing process, an aqueous solution of aluminum nitrate as described in Example 1 and a case 12 (an aluminum cylindrical case) were prepared. Then, the case 12 was dipped in the aqueous solution of aluminum nitrate for several seconds, pulled up from the solution and excessive solution was removed from the case. Next, the case 12 was held to dry in an atmosphere of 80° C. for 15 minutes, and the outer surface of the case 12 was washed with water so that the aluminum nitrate remained only on the inner surface. This cycle of dipping and drying was repeated until the weight of the aluminum nitrate became approximately 1 mg. Finally, the case 12 was held at 300° C. for 10 minutes in order to adhere aluminum oxide as the solid buffer 16 to the inner surface of the case 12. Separately, a pair of leads 14, 15 (aluminum leads) were prepared, to which the solid buffer 16 was not provided. An electric double layer capacitor was manufactured using these leads (14, 15) and the case 12 having the solid buffer manufactured in the above-method, in a process similar to that of Example 1.

Comparative Example 1

A case 12 having no aluminum oxide and a pair of leads having no aluminum oxide (14, 15) were prepared. An electric double layer capacitor was manufactured, using the leads and the case in a process similar to that of Example 1.

For each of the electric double layer capacitors obtained in Examples 1, 2 and Comparative Example 1, a humidity load test was carried out by applying voltages of 2.3V, 2.5V, and 2.7V, and maintaining the capacitor for 3000 hours in an atmosphere of 85° C. with a relative humidity of 85%. After the test, leakage of liquid for the respective electric double layer capacitors was checked visually before disassembling the capacities in order to inspect corrosion in the cathode leads (change in external appearance). The evaluation results are indicated in Table 1.

TABLE 1

|  | 2.3 V 3,000 hours | | 2.5 V 3,000 hours | | 2.7 V 3,000 hours | |
| --- | --- | --- | --- | --- | --- | --- |
|  | Leak of liquid | External appearance | Leak of liquid | External appearance | Leak of liquid | External appearance |
| Example 1 | No | Unchanged | No | Unchanged | No | Unchanged |
| Example 2 | No | Unchanged | No | Unchanged | No | Surface roughening |
| Com. Ex. 1 | No | Unchanged | No | Surface roughening | Yes | Surface corrosion |

*Com. Ex. = Comparative Example

The term 'surface roughening' in the columns of Table 1 indicates an initial stage of corrosion.

The following Example 3 relates to a coin-type electric double layer capacitor 20 shown in FIG. 2.

EXAMPLE 3

In Example 3, an electric double layer capacitor was manufactured by adhering a solid buffer 26 to the inner surface of a cathode case 24. For the manufacturing process, an aqueous solution of aluminum nitrate with a concentration of 10 wt % and a cathode case 24 of stainless steel were prepared. The aqueous solution of aluminum nitrate was brushed on the periphery but not the center (to which an electrode is connected) of the cathode case 24 before holding the cathode case 24 to dry at 80° C. for 15 minutes. This cycle of dipping and drying was repeated until the weight of the aluminum nitrate became approximately 0.1 mg. Finally, the cathode case 24 was retained at 300° C. for 10 minutes so that aluminum oxide adhered to the inner surface of the cathode case 24.

For providing an electrode, active carbon, carbon black, and polytetrafluoroethylene were mixed well using a mixer, where the ratio was 8:1:1 in weight. The mixture was diluted by adding a certain amount of pure water in an agate mortar and mixed further. This mixture was then introduced into a mold for forming pellets having a radius of 16 mm and molded under a pressure of about $1.5 \times 10^4$ N, which was dried under vacuum at a high temperature of 150° C. for 24 hours in order to remove water. It was punched to make a cylinder of 3 mmφ, so that an electrode was produced. The electrode had a thickness of about 600 μm.

Next, a polyphenylene sulfide sealer 21 was arranged on the periphery of the interior of the anode case 25. An electroconductive carbon paste was coated on the center of the interior of the anode case 25, on which the above-described electrode was placed and then a viscose rayon separator was arranged thereon. Similarly, an electroconductive carbon paste was coated on the center of the interior of the cathode case 24 having a solid buffer, on which the electrode was placed. After being dried at 150° C. for 24 hours, the electrodes housed in the cases were dipped in an electrolyte (a propylene carbonate solution of 1 mol/l tetraethyl ammonium tetrafluoroborate), in which the electrodes were immersed under reduced pressure so that a capacitor element 23 was manufactured. Finally, excess electrolyte was wiped out from the sealer 21, the cathode case 24, and from the anode case 25. The cases (24, 25) were assembled and sealed by caulking, so that an electric double layer capacitor was manufactured.

Comparative Example 2

A cathode case 24 used in Comparative Example 2 was not provided with aluminum oxide. This cathode case 24 was used to manufacture an electric double layer capacitor in a method similar to Example 3.

For each of the electric double layer capacitors obtained in Example 3 and Comparative Example 2, a humidity load test was carried out by applying voltages of 2.3V, 2.5V and 2.7V, and maintaining the capacitor for 3000 hours in an atmosphere of 75° C. with a relative humidity of 85%. After the test, leakage of liquid for the respective electric double layer capacitors was checked visually before disassembling the capacitors in order to inspect corrosion of the interiors of the cathode cases (change in external appearance). The evaluation results are indicated in Table 2.

TABLE 2

|  | 2.3 V 3,000 hours | | 2.5 V 3,000 hours | | 2.7 V 3,000 hours | |
| --- | --- | --- | --- | --- | --- | --- |
|  | Leak of liquid | External appearance | Leak of liquid | External appearance | Leak of liquid | External appearance |
| Example 3 | No | Unchanged | No | Unchanged | No | Unchanged |
| Com. Ex. 2 | No | Unchanged | No | Unchanged | Yes | Surface corrosion |

The aforementioned electric double layer capacitors according to the present invention have a high withstand voltage, since an applied solid buffer serves to suppress leakage of liquid or corrosion even under a condition that high voltage is applied.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. An electric double layer capacitor comprising a sealing member, an electrolyte and an electric double layer capacitor element both of which are sealed in the sealing member, the electric double layer capacitor further comprising a solid buffer arranged in the sealing member, wherein the solid buffer suppresses fluctuation in pH of the electrolyte.

2. The electric double layer capacitor according to claim 1, wherein the solid buffer is at least one compound selected from an oxide and a hydroxide.

3. The electric double layer capacitor according to claim 1, wherein the solid buffer is a compound of at least one element selected from the group consisting of Be, Al, Si, Sc, V, Cr, Fe, Ni, Cu, Zn, Ga, Ge, Y, Zr, Mo, Ag, Cd, In, Te, La, Ce, Pr, Nd, Pm, Gd, Dy, Ho, Er, Tm, Lu, W and Pb.

4. The electric double layer capacitor according to claim 2, wherein the solid buffer is a compound of at least one element selected from the group consisting of Be, Al, Si, Sc, V, Cr, Fe, Ni, Cu, Zn, Ga, Ge, Y, Zr, Mo, Ag, Cd, In, Te, La, Ce, Pr, Nd, Pm, Gd, Dy, Ho, Er, Tm, Lu, W and Pb.

5. The electric double layer capacitor according to claim 3, wherein the element is at least one selected from the group consisting of Be, Al, Si, Cr, Zn, Ga, Ge, Mo, In, Te, W and Pb.

6. The electric double layer capacitor according to claim 4, wherein the element is at least one selected from the group consisting of Be, Al, Si, Cr, Zn, Ga, Ge, Mo, In, Te, W and Pb.

7. The electric double layer capacitor according to claim 3, wherein the element is at least one selected from the group consisting of Be, Al, Sc, V, Cr, Fe, Ni, Cu, Zn, Ga, Y, Zr, Ag, Cd, In, Te, La, Ce, Pr, Nd, Pm, Gd, Dy, Ho, Er, Tm, Lu, and Pb.

8. The electric double layer capacitor according to claim 4, wherein the element is at least one selected from the group consisting of Be, Al, Sc, V, Cr, Fe, Ni, Cu, Zn, Ga, Y, Zr, Ag, Cd, In, Te, La, Ce, Pr, Nd, Pm, Gd, Dy, Ho, Er, Tm, Lu, and Pb.

9. The electric double layer capacitor according to claim 1, wherein the sealing member comprises a case provided with an opening and a sealer for sealing the opening of the case, and the solid buffer adheres to at least one of the case and the sealer.

10. The electric double layer capacitor according to claim 1, further comprising a lead extending from the interior of the sealing member to outside, wherein the solid buffer adheres to the lead in the sealing member.

* * * * *